United States Patent
Nagano et al.

(10) Patent No.: US 12,332,217 B2
(45) Date of Patent: Jun. 17, 2025

(54) ULTRASONIC INSPECTION APPARATUS

(71) Applicant: JTEKT CORPORATION, Kariya (JP)

(72) Inventors: Yousuke Nagano, Yao (JP); Akihiro Kariya, Yokohama (JP)

(73) Assignee: JTEKT CORPORATION, Kariya (JP)

( * ) Notice: Subject to any disclaimer, the term of this patent is extended or adjusted under 35 U.S.C. 154(b) by 304 days.

(21) Appl. No.: 18/133,335

(22) Filed: Apr. 11, 2023

(65) Prior Publication Data

US 2023/0375508 A1 Nov. 23, 2023

(30) Foreign Application Priority Data

May 23, 2022 (JP) .................................. 2022-084158

(51) Int. Cl.
*G01N 29/22* (2006.01)
*G01N 29/04* (2006.01)

(52) U.S. Cl.
CPC ............ *G01N 29/223* (2013.01); *G01N 29/04* (2013.01); *G01N 2291/023* (2013.01); *G01N 2291/102* (2013.01)

(58) Field of Classification Search
None
See application file for complete search history.

(56) References Cited

U.S. PATENT DOCUMENTS

| | | | |
|---|---|---|---|
| 6,247,367 B1* | 6/2001 | Bar-Cohen | G01N 29/223 73/620 |
| 2007/0169800 A1* | 7/2007 | Fani | B08B 3/10 134/184 |
| 2009/0165561 A1* | 7/2009 | Yabushita | G01N 29/2487 73/597 |
| 2011/0030479 A1* | 2/2011 | Murai | G01N 29/223 73/632 |
| 2018/0277266 A1* | 9/2018 | Rupin | G21C 17/003 |

FOREIGN PATENT DOCUMENTS

JP 2015-206782 A 11/2015

* cited by examiner

*Primary Examiner* — Suman K Nath
(74) *Attorney, Agent, or Firm* — Oliff PLC

(57) ABSTRACT

An ultrasonic inspection apparatus includes a transmitting and a receiving probe. The transmitting probe includes a first contact part having a first convex cylindrical surface in line contact with the curved surface, and a transmitting element configured to transmit an ultrasonic wave to the first surface. The receiving probe includes a second contact part having a second convex cylindrical surface, and a receiving element configured to receive an ultrasonic wave incident from the second surface. The transmitting element is provided along a first attachment surface perpendicular to a first transmitting virtual line that passes a first contact position and is slanted away from the receiving probe with respect to the line. The receiving element is provided along a second attachment surface perpendicular to a second receiving virtual line that passes a second contact position and is slanted away from the transmitting probe with respect to the second line.

4 Claims, 6 Drawing Sheets

ULTRASONIC INSPECTION APPARATUS

BACKGROUND OF THE INVENTION

1. Technical Field

The present invention relates to an ultrasonic inspection apparatus.

2. Description of the Related Art

There have been known an ultrasonic wave method (surface SH wave method) and X-ray diffractometry as a method of inspecting a fatigue degree or the like of a component made of a metal. Whereas the X-ray diffractometry has restrictions in terms of work qualification and a measurement environment, the ultrasonic wave method is more convenient.

The ultrasonic wave method includes repetitively executing an endurance test with application of a load to a testing target and measurement of a parameter (propagation velocity) with use of an ultrasonic wave, obtaining a relationship between the parameter and a fatigue degree each time, and preparing a database (calibration curve) containing results thereof. Actual operation includes measuring a parameter of a collected actual product (product collected from the market) or the like and referring to the database to check the fatigue degree of the actual product.

PATENT LITERATURE 1 discloses an ultrasonic inspection apparatus. The ultrasonic inspection apparatus includes a transmitting probe and a receiving probe.

CITATION LIST

Patent Literature

PATENT LITERATURE 1: Japanese Laid-Open Patent Publication No. 2015-206782

SUMMARY OF THE INVENTION

An ultrasonic inspection apparatus is typically configured to bring a transmitting probe and a receiving probe into contact with a flat surface of an inspection target. As depicted in FIG. 6, a transmitting probe 91 and a receiving probe 92 each have a contact part 93 to be brought into contact with an inspection target 100, and the contact part 93 has a block shape and a rectangular contact surface 94 with the inspection target 100. In a case where the inspection target 100 has a concave curved surface 99, the concave curved surface 99 and the contact part 93 brought into contact with each other have corner butting to generate a gap between the contact surface 94 and the concave curved surface 99, in which case measurement is failed.

For example, a cylindrical roller bearing includes an outer ring having a raceway surface having a concave curved surface shape on an inner circumference of the outer ring. The ultrasonic inspection apparatus depicted in FIG. 6 fails to bring the transmitting probe and the receiving probe into contact with the raceway surface in order to inspect the outer ring in terms of its fatigue degree.

In view of this, it is an object of the present disclosure to provide an ultrasonic inspection apparatus configured to inspect also an inspection target having a curved surface shape.

(1) An ultrasonic inspection apparatus according to the present disclosure includes a transmitting probe and a receiving probe, the apparatus configured to bring the transmitting probe and the receiving probe into contact with a curved surface being convexed or concaved, of an inspection target to execute ultrasonic inspection, in which the transmitting probe includes
a first contact part having a first convex cylindrical surface to be in line contact with the curved surface, and
a transmitting element provided at part of the first contact part and configured to transmit an ultrasonic wave to the first convex cylindrical surface, the receiving probe includes
a second contact part having a second convex cylindrical surface to be in line contact with the curved surface, and
a receiving element provided at part of the second contact part and configured to receive an ultrasonic wave incident from the second convex cylindrical surface, the transmitting element is provided along a first attachment surface perpendicular to a first transmitting virtual line passing a first contact position to be defined below and being slanted to be away from the receiving probe with respect to a first reference virtual line to be described below, and the receiving element is provided along a second attachment surface perpendicular to a second receiving virtual line passing a second contact position to be defined below and being slanted to be away from the transmitting probe with respect to a second reference virtual line to be described below;

the first contact position: a position where the first convex cylindrical surface and the curved surface are in line contact with each other, the second contact position: a position where the second convex cylindrical surface and the curved surface are in line contact with each other, the first reference virtual line: a virtual line passing a center of the curved surface and the first contact position, and the second reference virtual line: a virtual line passing the center of the curved surface and the second contact position.

When the ultrasonic wave from the transmitting probe to the inspection target has an incidence angle set to a predetermined angle, the ultrasonic wave propagates in a surface layer of the inspection target. The predetermined angle is determined in accordance with a material for the inspection target and a material for a portion (the first contact part) in contact with the inspection target, of the transmitting probe.

In view of this, in the ultrasonic inspection apparatus according to the present disclosure, the first convex cylindrical surface of the transmitting probe is in line contact with the curved surface of the inspection target, and the ultrasonic wave transmitted from the transmitting probe is incident on the curved surface at the first contact position. Provision of the transmitting element as described above enables setting, to the predetermined angle, the angle (incidence angle) between an incident direction of the ultrasonic wave at the first contact position and a normal line of the curved surface at the first contact position. The ultrasonic wave transmitted from the transmitting probe propagates in the surface layer of the inspection target.

The second convex cylindrical surface of the receiving probe is in line contact with the curved surface, and the ultrasonic wave propagating in the surface layer is incident on the second contact part at the second contact position. The receiving element provided as described above can be positioned ahead of a line along the incidence angle so as to enable detection of the ultrasonic wave.

The ultrasonic inspection apparatus thus enables inspection of also an inspection target having a curved surface shape.

(2) Preferably, the first contact position is located in the first convex cylindrical surface and at a circumferential center of the first convex cylindrical surface, and the second contact position is located in the second convex cylindrical surface and at a circumferential center of the second convex cylindrical surface. This configuration facilitates finding the contact positions of the first contact part and the second contact part to the curved surface of the inspection target, for higher inspection workability.

(3) Preferably, the apparatus further includes a coupling part coupling the transmitting probe and the receiving probe, and the coupling part attaches the transmitting probe and the receiving probe such that the transmitting probe and the receiving probe have an adjustable distance therebetween. This configuration allows the first contact part and the second contact part in appropriate postures according to the shape of the curved surface of the inspection target, to be in line contact with the curved surface.

(4) In the case of (3), further preferably, the coupling part is configured to retain the transmitting probe and the receiving probe such that the transmitting probe and the receiving probe have a constant distance therebetween. This configuration facilitates repeated inspection if there is a plurality of inspection targets and the inspection targets are identical in the shape of the curved surfaces, for higher workability.

The ultrasonic inspection apparatus according to the present disclosure enables inspection of also an inspection target having a curved surface shape.

DETAILED DESCRIPTION

Figure 1:
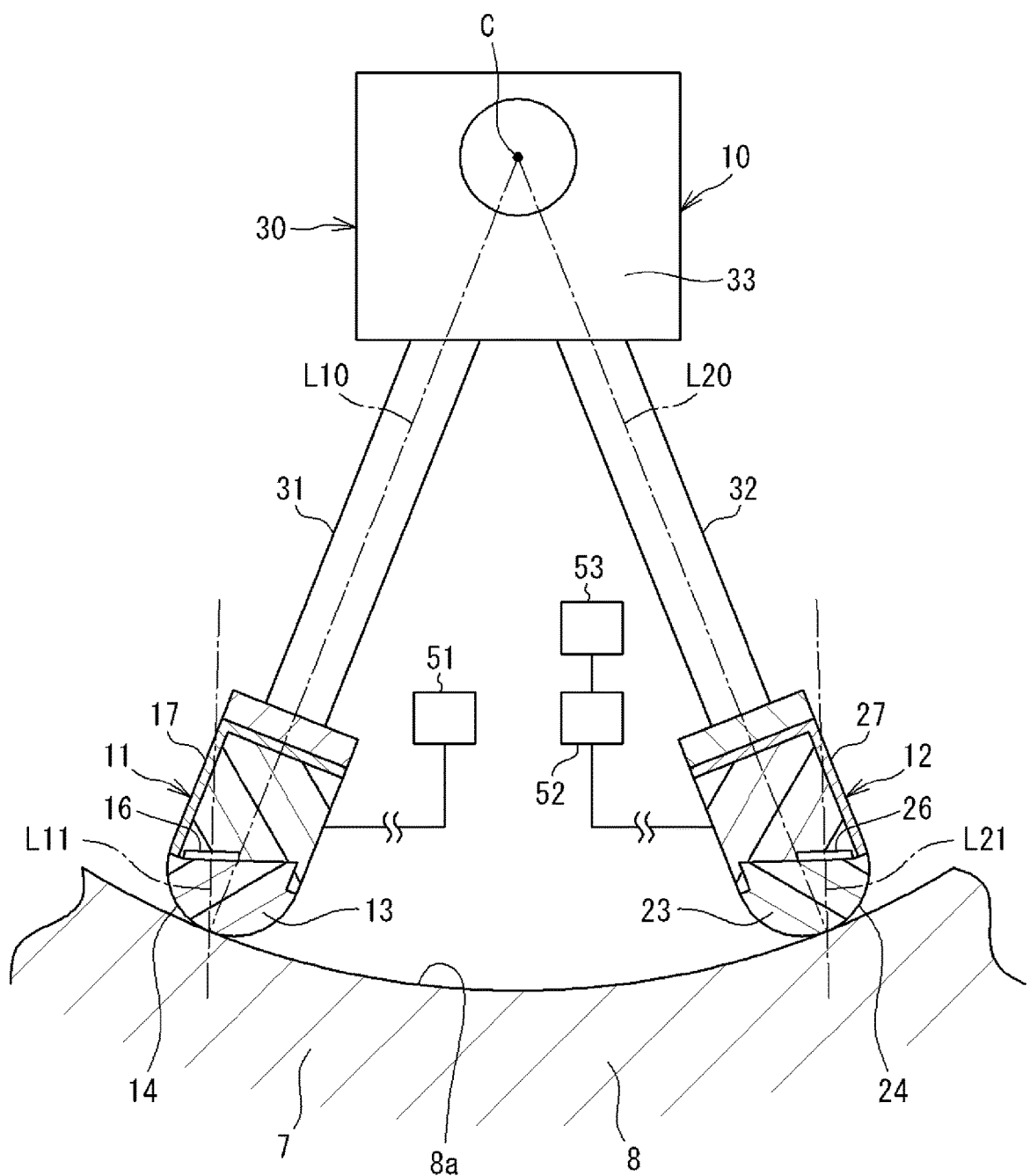
FIG. 1 is a schematic view of an exemplary ultrasonic inspection apparatus according to the present invention.

FIG. 1 is a schematic view of an exemplary ultrasonic inspection apparatus according to the present invention. FIG. 1 depicts an ultrasonic inspection apparatus 10 configured to nondestructively inspect an inspection target 7 made of a metal, in terms of an internal state such as a fatigue degree. The ultrasonic inspection apparatus 10 is configured on the basis of a surface SH wave method of inspecting the inspection target 7 in terms of its state, in accordance with velocity (time) of an ultrasonic wave propagating in a surface layer of the inspection target 7. The surface layer corresponds to a region adjacent to a surface of the inspection target 7, and is exemplified by a thin region within two to three millimeters from the surface.

The inspection target 7 according to the present embodiment is a bearing ring of a rolling bearing. The bearing ring is a ring-shaped member made of a metal. Specifically, the inspection target 7 depicted in FIG. 1 is an outer ring 8 of a roller bearing. The outer ring 8 has an inner circumference provided with a raceway surface 8a. The raceway surface 8a is in rolling contact with a cylindrical roller as a rolling element. Made in contact with the raceway surface 8a are a transmitting probe 11 and a receiving probe 12 to be described later. The raceway surface 8a of the outer ring 8 is a cylindrical surface, and has a concave curved surface as depicted in FIG. 1. The rolling bearing may be a tapered roller bearing. In this case, the raceway surface 8a of the outer ring 8 as the inspection target 7 expands along a conical surface and has the concave curved surface.

The ultrasonic inspection apparatus 10 includes the transmitting probe 11 and the receiving probe 12. The ultrasonic inspection apparatus 10 according to the present embodiment includes a coupling part 30 coupling the transmitting probe 11 and the receiving probe 12. The ultrasonic inspection apparatus 10 includes a pulse generator 51, an amplifier 52, and an arithmetic unit 53. The pulse generator 51 provides a transmitting element 16 of the transmitting probe 11 with an electric signal for causing the transmitting element 16 to generate an ultrasonic wave. The amplifier 52 includes an electric circuit, and is configured to acquire and amplify a received signal as an ultrasonic wave signal received by a receiving element 26 of the receiving probe 12. The arithmetic unit 53 includes a CPU, and calculates to obtain velocity (time) of the ultrasonic wave as a parameter of magnitude corresponding to the received signal thus amplified. In this manner, the ultrasonic inspection apparatus 10 is configured to bring the transmitting probe 11 and the receiving probe 12 into contact with the concave curved surface (raceway surface 8a) of the outer ring 8 as the inspection target 7, to execute ultrasonic inspection.

[Transmitting Probe 11]

Figure 2:
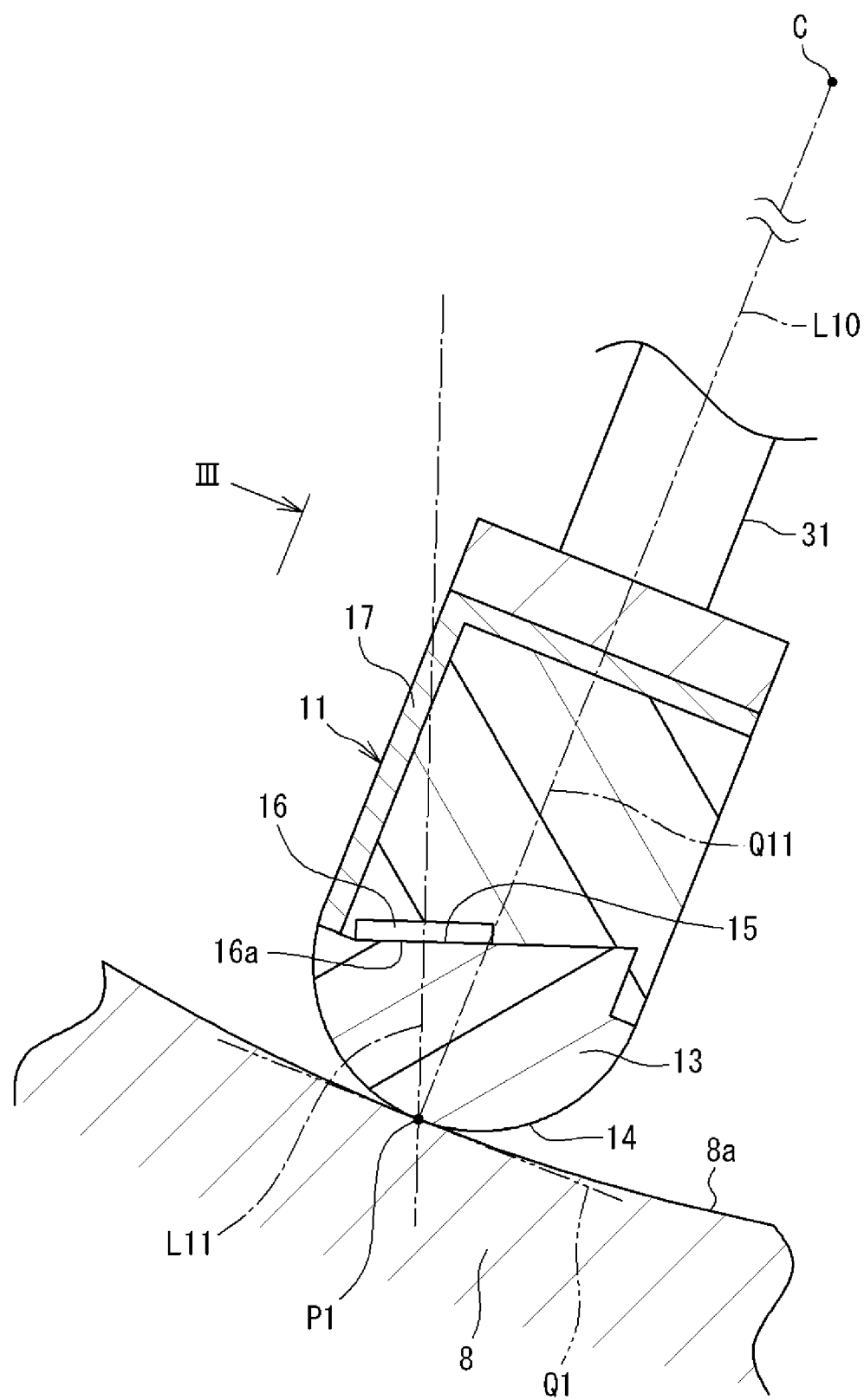
FIG. 2 is a sectional view of a transmitting probe, in an axis direction of an outer ring as an inspection target.
Figure 3:
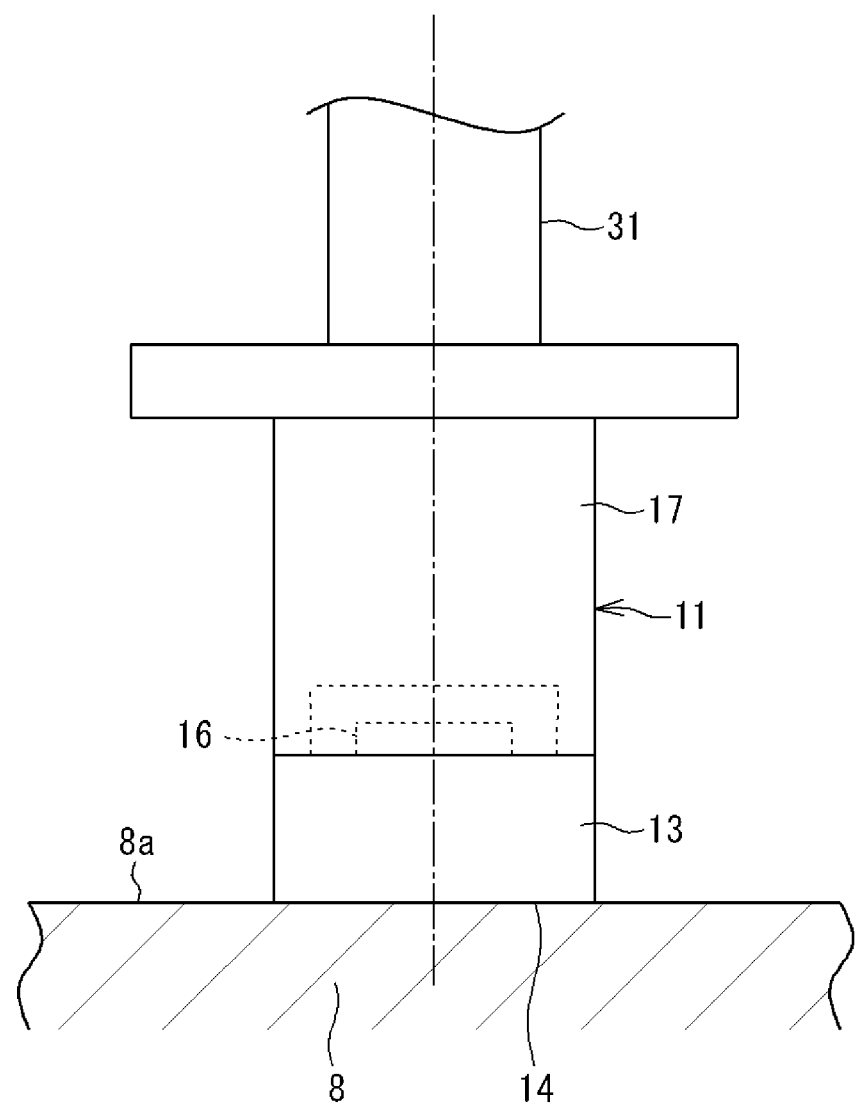
FIG. 3 is a view taken along line III indicated in FIG. 2.

The transmitting probe 11 includes a first body 17, a first contact part 13, and the transmitting element 16. The first body 17 is a case made of a metal or the like. Attached to the first body 17 is a first arm 31 of the coupling part 30 to be described later. The first contact part 13 is fixed to the first body 17. The first contact part 13 has a first convex cylindrical surface 14 to be in line contact with the raceway surface 8a. The transmitting element 16 is provided at part of the first contact part 13, and transmits an ultrasonic wave to the first convex cylindrical surface 14. FIG. 2 is an enlarged sectional view of the transmitting probe 11. FIG. 2 is a sectional view of the transmitting probe 11, in an axis direction of the outer ring 8 as the inspection target 7. FIG. 3 is a view taken along line III indicated in FIG. 2.

The first contact part 13 has only to be an ultrasonic wave propagation medium, and the first contact part 13 according to the present embodiment is made of a resin. The first contact part 13 has a semicolumnar shape, and the first convex cylindrical surface 14 has a semicylindrical surface shape. The first contact part 13 may not have a precise semicolumnar shape with the angle of 180 degrees. That is, the first convex cylindrical surface 14 may not have a precise semicylindrical shape with the angle of 180 degrees. For example, the first convex cylindrical surface 14 may alternatively have a shape along a cylinder with the angle of 160 degrees. The first contact part 13 is a solid member, and has a surface different from (opposite to) the first convex cylindrical surface 14, and the transmitting element 16 is attached to the surface.

The first body 17 is a hollow member. In a state where the first contact part 13 provided with the transmitting element 16 is integrated with the first body 17, the first body 17 is filled with a molten resin to be cured. The transmitting element 16 is connected with a lead wire extended to outside the first body 17.

The transmitting element 16 is applied to a typical ultrasonic inspection apparatus, and examples of the transmitting element include an ultrasonic probe constituted by a piezoelectric element having a flat plate shape. The transmitting element 16 is configured to output a transverse ultrasonic wave. When the pulse generator 51 applies pulse voltage having predetermined voltage to the transmitting element 16, an ultrasonic wave having a predetermined frequency is outputted from a flat surface 16a of the transmitting element 16. The ultrasonic wave thus outputted is transmitted from the first contact part 13 to outside.

The transmitting element 16 has a flat plate shape. The transmitting element 16 outputs the ultrasonic wave in a direction perpendicular to the flat surface 16a of the transmitting element 16. The transmitting element 16 is attached to the first contact part 13 such that the direction of the outputted ultrasonic wave passes a single point on the first convex cylindrical surface 14. The single point corresponds to a first contact position P1 where the first convex cylindrical surface 14 and the raceway surface 8a are in contact with each other. The first convex cylindrical surface 14 and the raceway surface 8a come into line contact with each other. The first contact position P1 is thus included within a range of the line contact (a range along the line). The first contact position P1 according to the present embodiment is located in the first convex cylindrical surface 14 and at a circumferential center of the first convex cylindrical surface 14.

The ultrasonic wave outputted from the transmitting element 16 contains a vibrational component (SH wave) incident on the first contact position P1 while vibrating parallelly to the flat surface 16a as an output surface of the transmitting element 16, and a vibrational component (SV wave) incident on the first contact position P1 while vibrating perpendicularly to a vibration direction of the SH wave.

The direction of the ultrasonic wave outputted from the transmitting element 16 is neither parallel nor perpendicular to a first tangent Q1 of the first convex cylindrical surface 14 (the raceway surface 8a) at the first contact position P1, but is slanted from the first tangent Q1. In other words, at the first contact position P1, the ultrasonic wave from the transmitting element 16 is incident on the raceway surface 8a in a slanted direction, neither parallelly nor perpendicularly to the first tangent Q1. The ultrasonic wave outputted from the transmitting element 16 is transmitted from the first contact position P1 to outside.

When the ultrasonic wave from the transmitting probe 11 (transmitting element 16) to the inspection target 7 (outer ring 8) has an incidence angle set to a predetermined angle, the ultrasonic wave propagates in the surface layer of the inspection target 7 (outer ring 8). The predetermined angle is determined in accordance with a material for the inspection target 7 (outer ring 8) and a material for a portion (the first contact part 13) in contact with the inspection target 7, of the transmitting probe 11.

In order for such propagation of the ultrasonic wave in the surface layer of the outer ring 8, the transmitting element 16 is disposed as follows at the first contact part 13.

The transmitting element 16 is provided along a first attachment surface 15 perpendicular to a first transmitting virtual line L11. The first transmitting virtual line L11 passes the first contact position P1, and is slanted to be away (leftward in FIG. 1 and FIG. 2) from the receiving probe 12 (see FIG. 1) with respect to a first reference virtual line L10 to be defined below.

First reference virtual line L10: virtual line passing a center C of the raceway surface 8a and the first contact position P1

As described above, the first contact position P1 is located where the first convex cylindrical surface 14 and the raceway surface 8a are in line contact with each other.

The first attachment surface 15 is flat, and is attached to part of the first contact part 13. The flat surface 16a of the transmitting element 16 is intimately attached to the first attachment surface 15.

Such provision of the transmitting element 16 enables setting, to the predetermined angle, the angle (incidence angle) between an incident direction of the ultrasonic wave at the first contact position P1 and a first normal line Q11 of the raceway surface 8a at the first contact position P1. The ultrasonic wave transmitted from the transmitting probe 11 thus propagates in the surface layer of the outer ring 8.

[Receiving Probe 12]

Figure 4:
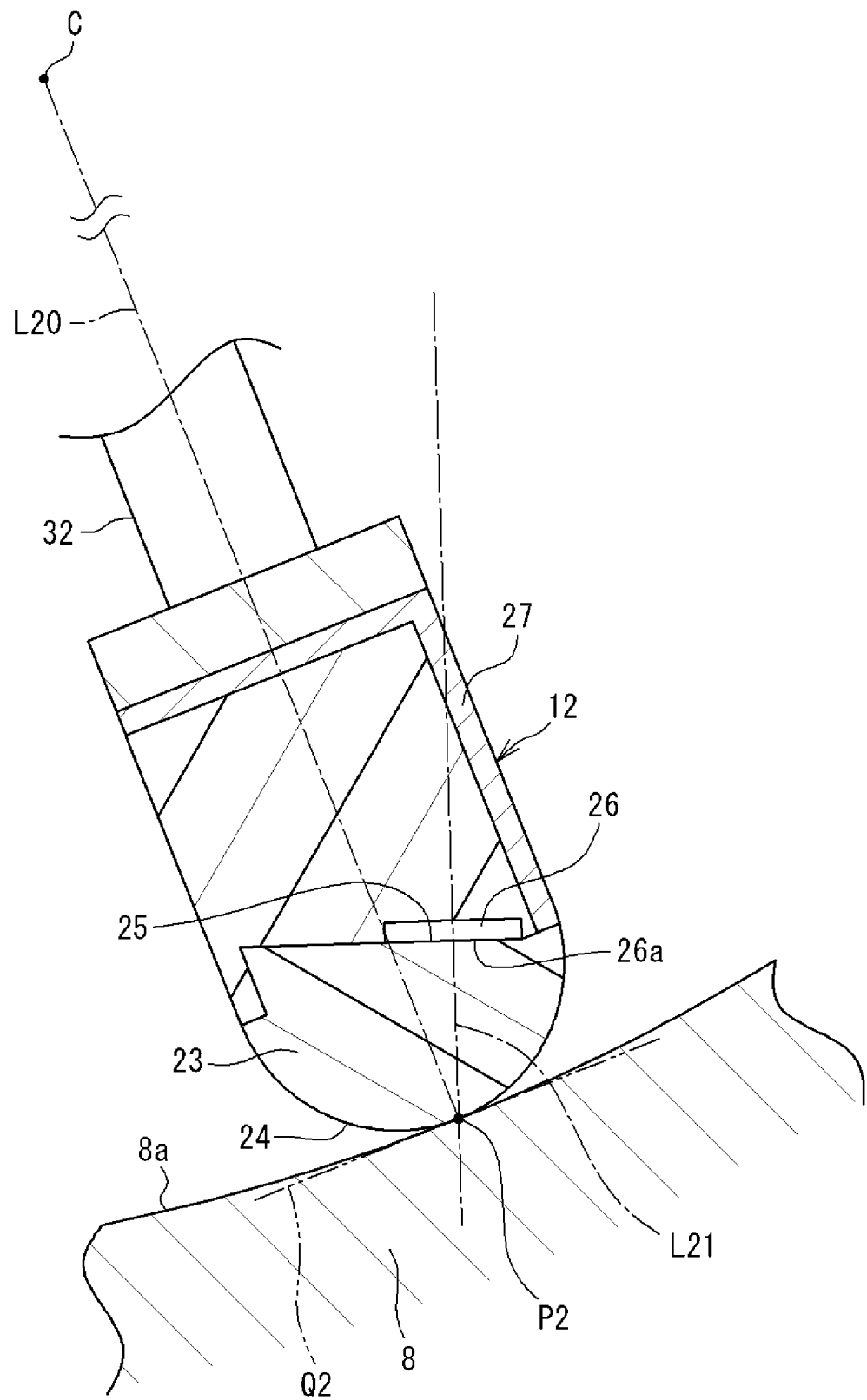
FIG. 4 is an enlarged sectional view of a receiving probe.

As depicted in FIG. 1, the receiving probe 12 includes a second body 27, a second contact part 23, and the receiving element 26. The second body 27 is a case made of a metal or the like. Attached to the second body 27 is a second arm 32 of the coupling part 30 to be described later. The second contact part 23 is fixed to the second body 27. The second contact part 23 has a second convex cylindrical surface 24 to be in line contact with the raceway surface 8a. The second contact part 23 is in contact with the raceway surface 8a at a position away from the first contact part 13. The receiving element 26 is provided at part of the second contact part 23, and receives an ultrasonic wave incident from the second convex cylindrical surface 24. FIG. 4 is an enlarged sectional view of the receiving probe 12.

The second contact part 23 has only to be an ultrasonic wave propagation medium, and the second contact part 23 according to the present embodiment is made of a resin. The second contact part 23 has a semicolumnar shape, and the second convex cylindrical surface 24 has a semicylindrical surface shape. The second contact part 23 may not have a precise semicolumnar shape with the angle of 180 degrees. That is, the second convex cylindrical surface 24 may not have a precise semicylindrical shape with the angle of 180 degrees. For example, the second convex cylindrical surface 24 may alternatively have a shape along a cylinder with the angle of 160 degrees. The second contact part 23 is a solid member, and has a surface different from (opposite to) the second convex cylindrical surface 24, and the receiving element 26 is attached to the surface.

The second body 27 is a hollow member. In a state where the second contact part 23 provided with the receiving element 26 is integrated with the second body 27, the second body 27 is filled with a molten resin to be cured. The receiving element 26 is connected with a lead wire extended to outside the second body 27.

The receiving element 26 is applied to a typical ultrasonic inspection apparatus, and examples of the receiving element include an ultrasonic probe constituted by a piezoelectric element having a flat plate shape. The receiving element 26 receives an ultrasonic wave incident on the second contact part 23 to generate predetermined voltage. The receiving element 26 has a flat plate shape. The receiving element 26 is configured similarly to the transmitting element 16, but includes a piezoelectric element for transverse wave detection, configured to receive at least the SH wave. The receiving element 26 receives an ultrasonic wave, generates voltage according to magnitude of the ultrasonic wave, and outputs the voltage as a received signal to the amplifier 52 (see FIG. 1).

The receiving element 26 receives the ultrasonic wave in a direction perpendicular to a flat surface 26a of the receiving element 26. The receiving element 26 is attached to the second contact part 23 such that the direction of the received ultrasonic wave is from a single point on the second convex cylindrical surface 24 to the receiving element 26. The single point corresponds to a second contact position P2 where the second convex cylindrical surface 24 and the raceway surface 8a are in contact with each other. The second convex cylindrical surface 24 and the raceway surface 8a come into line contact with each other. The second contact position P2 is thus included within a range of the line contact (a range along the line). The second contact position P2 according to the present embodiment is located in the second convex cylindrical surface 24 and at a circumferential center of the second convex cylindrical surface 24.

The direction of the ultrasonic wave received by the receiving element 26 is neither parallel nor perpendicular to a second tangent Q2 of the second convex cylindrical surface 24 (the raceway surface 8a) at the second contact position P2, but is slanted from the second tangent Q2. The ultrasonic wave outputted from the transmitting element 16 and propagating in the surface layer of the outer ring 8 is incident on the second contact part 23 at the second contact position P2. When the second contact part 23 is brought into contact with the raceway surface 8a at the second contact position P2, the ultrasonic wave incident on the second contact part 23 at the second contact position P2 propagates in a slanted direction, neither parallelly nor perpendicularly to the second tangent Q2.

An ultrasonic wave from the raceway surface 8a is incident on the second contact part 23 at an incidence angle determined in accordance with the material for the inspection target 7 (outer ring 8) and the material for a portion (the second contact part 23) in contact with the inspection target 7, of the transmitting probe 11.

The receiving element 26 is disposed as follows at the second contact part 23 such that the receiving element 26 receives the ultrasonic wave incident on the second contact part 23 from the outer ring 8 as described above, in other words, such that the direction of the ultrasonic wave incident on the second contact part 23 at the second contact position P2 matches the direction of the ultrasonic wave received by the receiving element 26.

The receiving element 26 is provided along a second attachment surface 25 perpendicular to a second receiving virtual line L21. The second receiving virtual line L21 passes the second contact position P2, and is slanted to be away (rightward in FIG. 1 and FIG. 4) from the transmitting probe 11 (see FIG. 1) with respect to a second reference virtual line L20 to be defined below.

Second reference virtual line L20: virtual line passing the center C of the raceway surface 8a and the second contact position P2

As described above, the second contact position P2 is located where the second convex cylindrical surface 24 and the raceway surface 8a are in line contact with each other.

The second attachment surface 25 is flat, and is attached to part of the second contact part 23. The flat surface 26a of the receiving element 26 is intimately attached to the second attachment surface 25.

In this manner, the second convex cylindrical surface 24 of the receiving probe 12 is in line contact with the raceway surface 8a, and the ultrasonic wave propagating in the surface layer of the outer ring 8 is incident on the second contact part 23 at the second contact position P2. The receiving element 26 provided as described above can be positioned ahead of a line along the incidence angle so as to enable detection of an ultrasonic wave.

As described above, the ultrasonic inspection apparatus 10 according to the present embodiment enables inspection of also the outer ring 8 having the curved surface shape.

[Coupling Part 30]

As described earlier (see FIG. 1), the ultrasonic inspection apparatus 10 includes the coupling part 30 coupling the transmitting probe 11 and the receiving probe 12. The coupling part 30 includes a base body 33, the first arm 31, and the second arm 32. The first arm 31 has a first end provided with the transmitting probe 11, and a second end supported by the base body 33. The second arm 32 has a first end provided with the receiving probe 12, and a second end supported by the base body 33.

The base body 33 swingably supports the first arm 31 and the second arm 32. The arms each swing in a direction allowing the transmitting probe 11 and the receiving probe 12 to come close to each other and move away from each other. The coupling part 30 attaches the transmitting probe 11 and the receiving probe 12 such that the transmitting probe 11 and the receiving probe 12 have an adjustable distance therebetween. This configuration allows the first contact part 13 and the second contact part 23 in appropriate postures according to the shape of the raceway surface 8a, to be in line contact with the raceway surface 8a. Particularly facilitated is bringing the first convex cylindrical surface 14 and the second convex cylindrical surface 24 into contact with the raceway surface 8a at the first contact position P1 and the second contact position P2, respectively.

The base body 33 is configured to swingably support the first arm 31 as well as unswingably restrain the first arm 31 at a predetermined position. Though not depicted, for example, the first arm 31 is unswingable with respect to the base body 33 when fastening a lock bolt, and is swingable when loosening the lock bolt. Similarly, the base body 33 is configured to swingably support the second arm 32 as well as unswingably restrain the second arm 32 at a predetermined position. The coupling part 30 is accordingly configured to retain the transmitting probe 11 and the receiving probe 12 such that the transmitting probe 11 and the receiving probe 12 have a constant distance therebetween. This configuration enables repeated inspection if there is a plurality of outer rings 8 as inspection targets and the outer rings 8 are identical in the shape of the raceway surfaces 8a, for improvement in workability.

[When Inspection Target 7 is Inner Ring 9]

Figure 5:
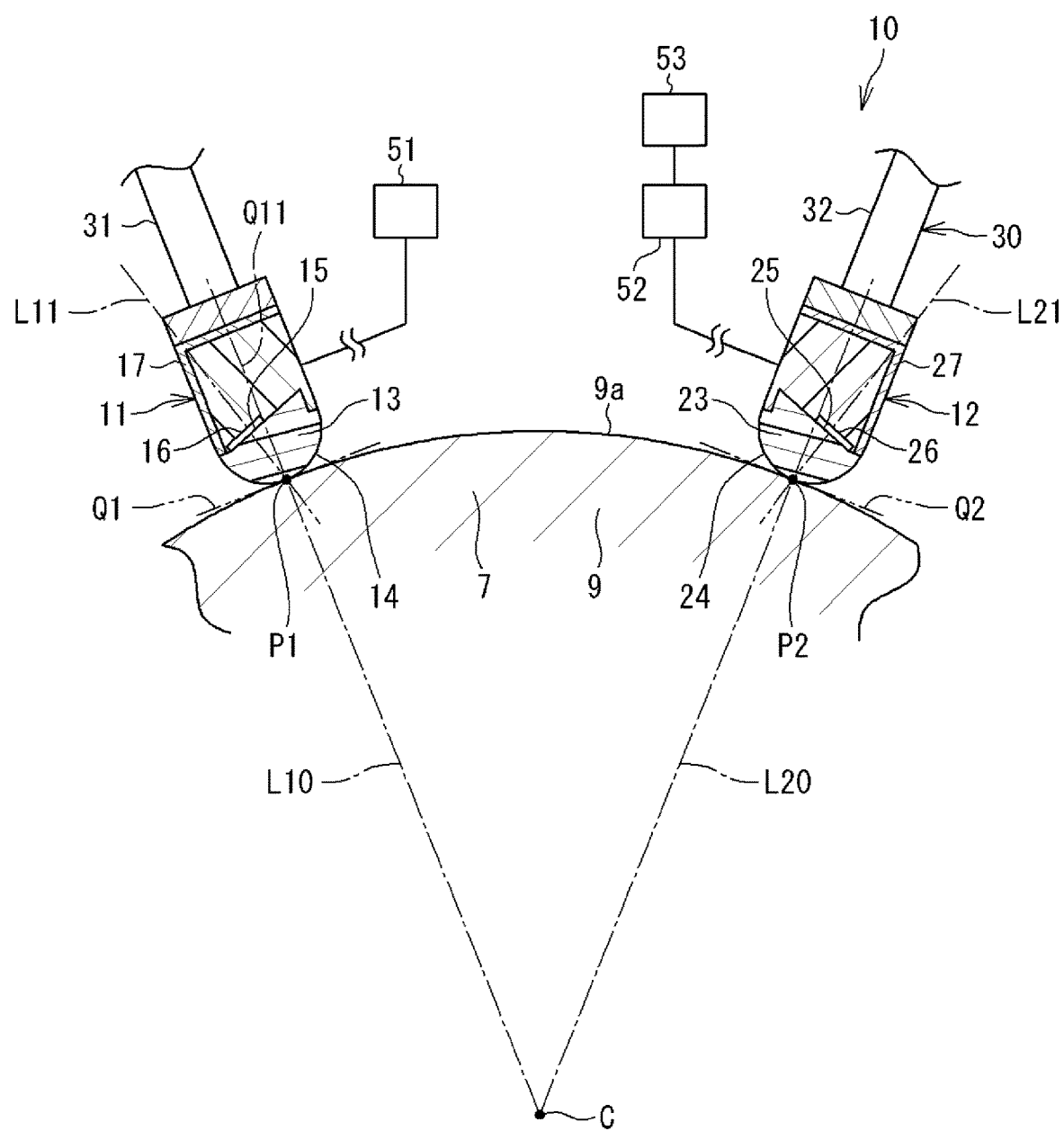
FIG. 5 is a schematic view of an ultrasonic inspection apparatus according to another mode of the present invention.
Figure 6:
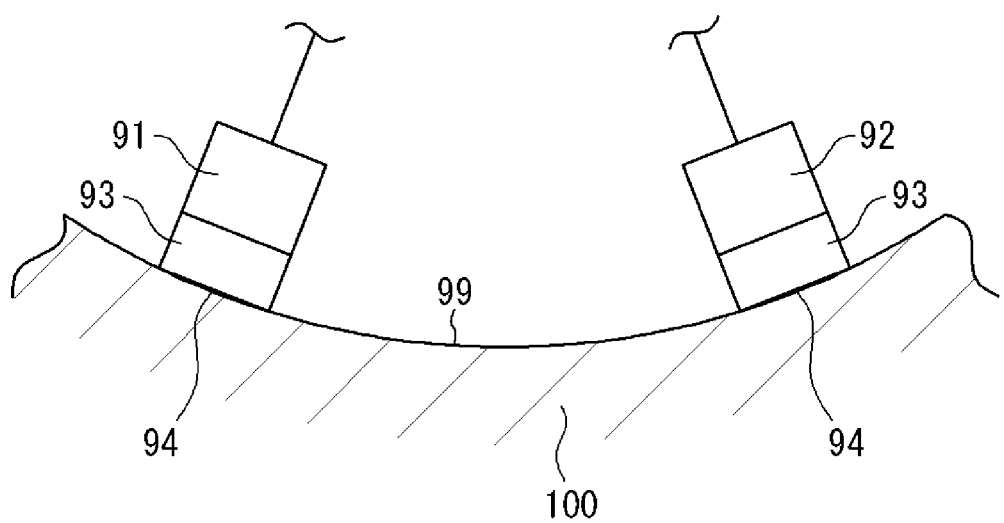
FIG. 6 is an explanatory view of a conventional ultrasonic inspection apparatus.

FIG. 5 is a schematic view of an ultrasonic inspection apparatus according to another mode of the present invention. In comparison to the mode relevant to FIG. 1, the ultrasonic inspection apparatus 10 depicted in FIG. 5 is similar in that the inspection target 7 is the bearing ring of the rolling bearing, but the inspection target is the inner ring 9 of a roller bearing, which is different from the outer ring 8 depicted in FIG. 1. The inner ring 9 has an outer circumference provided with a raceway surface 9a. The raceway surface 9a is in rolling contact with a cylindrical roller as a rolling element. Made in contact with the raceway surface 9a are the transmitting probe 11 and the receiving probe 12. The raceway surface 9a of the inner ring 9 is a cylindrical surface, and has a convex curved surface as depicted in FIG. 5. The roller bearing may be a tapered roller bearing. In this case, the raceway surface 9a of the inner ring 9 as the inspection target 7 is a conical surface and has the convex curved surface.

The ultrasonic inspection apparatus 10 depicted in FIG. 5 includes the transmitting probe 11 and the receiving probe 12, and is configured to bring the transmitting probe 11 and the receiving probe 12 into contact with the convex curved surface (raceway surface 9a) of the inspection target 7 so as to execute ultrasonic inspection.

The transmitting probe 11 includes the first contact part 13 and the transmitting element 16. The first contact part 13 has the first convex cylindrical surface 14 to be in line contact with the raceway surface 9a. The transmitting element 16 is provided at part of the first contact part 13, and transmits an ultrasonic wave to the first convex cylindrical surface 14.

The receiving probe 12 includes the second contact part 23 and the receiving element 26. The second contact part 23 has the second convex cylindrical surface 24 to be in line contact with the raceway surface 9a. The receiving element 26 is provided at part of the second contact part 23, and receives an ultrasonic wave incident from the second convex cylindrical surface 24.

The transmitting element 16 is provided along the first attachment surface 15 perpendicular to the first transmitting virtual line L11. The first transmitting virtual line L11 passes the first contact position P1, and is slanted to be away (leftward in FIG. 5) from the receiving probe 12 with respect to the first reference virtual line L10 to be defined below.

First Reference Virtual Line L10: Virtual Line Passing a Center C of the Raceway Surface 9a and the First Contact Position P1

The first contact position P1 is located where the first convex cylindrical surface 14 and the raceway surface 9a are in line contact with each other.

The receiving element 26 is provided along the second attachment surface 25 perpendicular to the second receiving virtual line L21. The second receiving virtual line L21 passes the second contact position P2, and is slanted to be away (rightward in FIG. 5) from the transmitting probe 11 with respect to the second reference virtual line L20 to be defined below.

Second Reference Virtual Line L20: Virtual Line Passing the Center C of the Raceway Surface 9a and the Second Contact Position P2

The second contact position P2 is located where the second convex cylindrical surface 24 and the raceway surface 8a are in line contact with each other.

Also in the embodiment relevant to FIG. 5, the first contact position P1 is located in the first convex cylindrical surface 14 and at the circumferential center of the first convex cylindrical surface 14. The second contact position P2 is located in the second convex cylindrical surface 24 and at the circumferential center of the second convex cylindrical surface 24.

Also in the embodiment relevant to FIG. 5, the ultrasonic inspection apparatus 10 includes the coupling part 30. The coupling part 30 attaches the transmitting probe 11 and the receiving probe 12 such that the transmitting probe 11 and the receiving probe 12 have an adjustable distance therebetween. Furthermore, the coupling part 30 is configured to retain the transmitting probe 11 and the receiving probe 12 such that the transmitting probe 11 and the receiving probe 12 have a constant distance therebetween. The coupling part 30 achieving such functions is specifically configured similarly to the mode relevant to FIG. 1, and includes the single common base body (not depicted), the first arm 31, and the second arm 32.

The configurations described with reference to FIG. 1 to FIG. 4 are each appropriately applicable to the ultrasonic inspection apparatus 10 depicted in FIG. 5. In the ultrasonic inspection apparatus 10 depicted in FIG. 5, configurations similar to those in the ultrasonic inspection apparatus 10 depicted in FIG. 1 to FIG. 4 are denoted by identical reference signs, and will not be described repeatedly.

[Others]

The above embodiments refer to the case where the inspection target 7 is the bearing ring (the outer ring 8 or the inner ring 9) of the rolling bearing. Alternatively, the inspection target 7 may be different from the bearing ring, and has only to have a concave or convex curved surface.

The coupling part 30 may alternatively be configured differently from the depicted mode, and may include, in addition to the mechanism configured to swingably support the transmitting probe 11 and the receiving probe 12, a mechanism configured to parallelly movably support the transmitting probe 11 and the receiving probe 12.

The embodiments disclosed herein are exemplary and are not restrictive at any point. The present invention has the scope of rights that should not be limited to the above embodiments but include any modification within a scope equivalent to the configurations recited in patent claims.

REFERENCE SIGNS LIST 7 inspection target
8 outer ring
8a raceway surface (curved surface)
9 inner ring
9a raceway surface (curved surface)
10 ultrasonic inspection apparatus
11 transmitting probe
12 receiving probe
13 first contact part
14 first convex cylindrical surface
15 first attachment surface
16 transmitting element
23 second contact part
24 second convex cylindrical surface
25 second attachment surface
26 receiving element
30 coupling part
C center
L10 first reference virtual line
L11 first transmitting virtual line
L20 second reference virtual line
L21 second receiving virtual line

What is claimed is:

1. An ultrasonic inspection apparatus comprising a transmitting probe and a receiving probe, the apparatus configured to bring the transmitting probe and the receiving probe into contact with a curved surface being convexed or concaved, of an inspection target to execute ultrasonic inspection, wherein the transmitting probe includes
a first contact part having a first convex cylindrical surface to be in line contact with the curved surface, and
a transmitting element provided at part of the first contact part and configured to transmit an ultrasonic wave to the first convex cylindrical surface, the receiving probe includes
a second contact part having a second convex cylindrical surface to be in line contact with the curved surface, and a receiving element provided at part of the second contact part and configured to receive an ultrasonic wave incident from the second convex cylindrical surface, the transmitting element is provided along a first attachment surface perpendicular to a first transmitting virtual line passing a first contact position to be defined below and being slanted to be away from the receiving probe with respect to a first reference virtual line to be defined below, and the receiving element is provided along a second attachment surface perpendicular to a second receiving virtual line passing a second contact position to be defined below and being slanted to be away from the transmitting probe with respect to a second reference virtual line to be defined below;

the first contact position: a position where the first convex cylindrical surface and the curved surface are in line contact with each other, the second contact position: a position where the second convex cylindrical surface and the curved surface are in line contact with each other, the first reference virtual line: a virtual line passing a center of the curved surface and the first contact position, and the second reference virtual line: a virtual line passing the center of the curved surface and the second contact position.

2. The ultrasonic inspection apparatus according to claim 1, wherein the first contact position is located in the first convex cylindrical surface and at a circumferential center of the first convex cylindrical surface, and the second contact position is located in the second convex cylindrical surface and at a circumferential center of the second convex cylindrical surface.

3. The ultrasonic inspection apparatus according to claim 1, the apparatus further comprising a coupling part coupling the transmitting probe and the receiving probe, wherein the coupling part attaches the transmitting probe and the receiving probe such that the transmitting probe and the receiving probe have an adjustable distance therebetween.

4. The ultrasonic inspection apparatus according to claim 3, wherein the coupling part is configured to retain the transmitting probe and the receiving probe such that the transmitting probe and the receiving probe have a constant distance therebetween.

* * * * *